United States Patent [19]

Kim

[11] Patent Number: 5,710,610

[45] Date of Patent: Jan. 20, 1998

[54] APPARATUS AND METHOD FOR CREATING MULTIPLE TILT ANGLES BY RUBBING THE ALIGNMENT LAYER APPLIED TO THIN FILM TRANSISTORS AND COLOR FILTER GLASS PLATES OF A LIQUID CRYSTAL DISPLAY

[75] Inventor: Hyun-dae Kim, Kyonggi-do, Rep. of Korea

[73] Assignee: Samsung Electronics Co., Ltd., Suwon, Rep. of Korea

[21] Appl. No.: 575,875

[22] Filed: Dec. 21, 1995

[30] Foreign Application Priority Data

Dec. 21, 1994 [KR] Rep. of Korea ............ 94-35630

[51] Int. Cl.⁶ .................................. G02F 1/1337
[52] U.S. Cl. .................................. 349/126; 349/129
[58] Field of Search ........................... 349/126, 129, 349/187, 123; 264/340; 428/1; 156/229, 324; 430/20

[56] References Cited

U.S. PATENT DOCUMENTS

| 5,075,790 | 12/1991 | Hayashi et al. | 349/126 |
| 5,221,981 | 6/1993 | Kodera et al. | 349/126 |
| 5,353,141 | 10/1994 | Onuma et al. | 349/126 |
| 5,406,397 | 4/1995 | Kodera et al. | 349/126 |
| 5,422,750 | 6/1995 | Kodera et al. | 349/126 |

FOREIGN PATENT DOCUMENTS 4-60515  2/1992  Japan.

Primary Examiner—William L. Sikes
Assistant Examiner—Tai V. Duong
Attorney, Agent, or Firm—Cushman Darby & Cushman Intellectual Property Group of Pillsbury Madison & Sutro LLP

[57] ABSTRACT

An apparatus for rubbing the alignment layer applied to a thin film transistor and a color filter glass plate of a liquid crystal display to set the molecular orientation of the liquid crystals includes a cylindrical roll with a round peripheral surface covered by a piled fabric having pile, and a table for supporting the thin film transistor or color filter glass plate. The cylindrical roll is rotated with the pile contacting the alignment layer of the thin film transistor or color filter glass plate while moving the table relative to the cylindrical roll so that the surface of the alignment layer is rubbed. The pile includes a plurality of properly defined sections having alternate short and long pile so as to alternately vary the rubbing strength of the piled fabric against the alignment layer.

9 Claims, 2 Drawing Sheets

APPARATUS AND METHOD FOR CREATING MULTIPLE TILT ANGLES BY RUBBING THE ALIGNMENT LAYER APPLIED TO THIN FILM TRANSISTORS AND COLOR FILTER GLASS PLATES OF A LIQUID CRYSTAL DISPLAY

BACKGROUND OF THE INVENTION

1. Field of the Invention

The present invention relates to an apparatus for rubbing the alignment layer applied to the thin film transistor (TFT) and the color filter (C/F) glass plate of a liquid crystal display (LCD).

2. Description of Related Art

Generally, a TFT LCD comprises a TFT glass plate with a plurality of switching elements such as TFTs and pixel electrodes, a C/F glass plate with a plurality of color filters, a liquid crystal material interposed between the two glass plates, a polarizing plate mounted on the outer surface of each glass plate, and a backlight with a diffused layer. The alignment layer applied to each glass plate usually consists of polyimide.

The contrast of a twisted nematic (TN) mode LCD depends on the viewing angle. Various methods for improving the contrast have been proposed including the use of two domain TN cells (TDTN), proposed in IDRC 91 Digest, pp 68 by K. H. Yang, wherein the directions of the two domains are slantingly and oppositely arranged. This method provides diametrical viewing characteristics in both horizontal and vertical directions, thus widening the allowable viewing angle. However, this involves rubbing the polyimide alignment layer several times. Specifically, the optical process must be repeated two times and the rubbing process four times. Accordingly, this method of fabricating the LCD is complicated, and the polyimide alignment layer is frequently damaged due an alkaline developing step in the optical process.

Another method, proposed by Y. Koike, et al., employs domain divided TN (DDTN) cells, where the patterned organic or inorganic alignment layer is subjected to the rubbing process only once. Still another method, proposed by K. Takatori, involves complementary TN cells. An additional method, involving pixel divided TN cells, is disclosed in the article entitled as "Wide-Viewing-Angle Improvements for AMLCDs", SID 93 DIGEST pp.265-268, and in Japan DISPLAY '92 pp.591-594.

Such conventional methods increase the number of processing steps, and barely improve the scope of the viewing angle.

SUMMARY OF THE INVENTION

It is an object of the present invention to provide for widening the viewing angle without increasing the processing steps in fabrication of an LCD.

It is another object of the present invention to provide an improved device for rubbing the alignment layer of an LCD to widen the viewing angle.

According to the present invention, an apparatus for rubbing the alignment layer applied to the TFT and the C/F glass plate of an LCD to set the molecular orientation of the liquid crystals includes a cylindrical roll with a round peripheral surface covered by a fabric having pile, and a table for supporting the TFT or CF glass plate. The cylindrical roll is rotated with the pile contacting the alignment layer of the TFT or CF glass plate while moving the alignment layer relative to the cylindrical roll so that the surface of the alignment layer is rubbed. The pile further includes a plurality of alternate short and long pile sections which alternately vary the rubbing strength of the piled fabric against the alignment layer through it.

Preferably, the arrangement of the short and long pile is regular, although it may also be irregular and the number of sections having different pile lengths is two or more. The rotational speed of the cylindrical roll may have any value in connection with the moving speed of the TFT or CF glass plate relative to the cylindrical roll.

BRIEF DESCRIPTION OF THE ATTACHED DRAWINGS

The preferred embodiments of the present invention will now be described more specifically with reference to the attached drawings, wherein.

DETAILED DESCRIPTION OF PREFERRED EMBODIMENT

Figure 1:
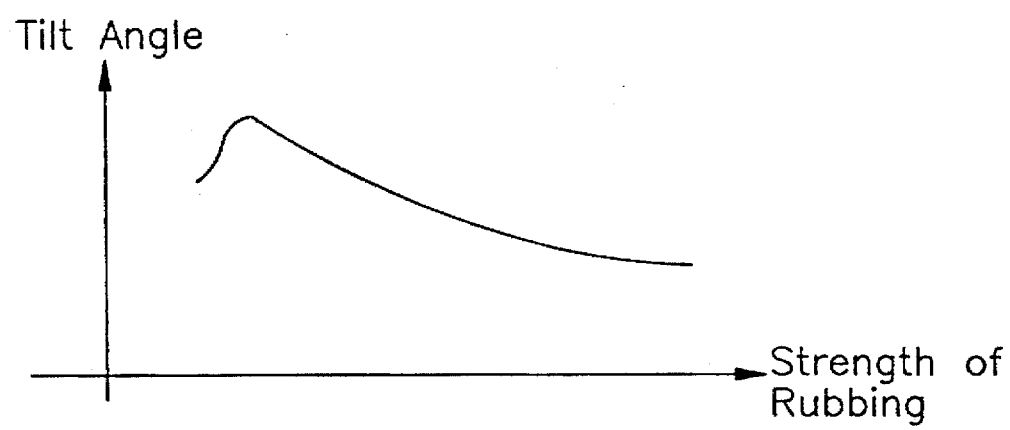
FIG. 1 is a graph for showing the relationship between the strength of the rubbing and the tilt angle of the liquid crystals.

In an LCD, the molecular orientation of the liquid crystals with reference to the alignment layer may be changed by rubbing the alignment layer applied to the glass plates. The display characteristics of the LCD depends on the tilt angle representing the molecular orientation. The strength of rubbing the alignment layer is related to the tilt angle, which is reduced with the strength of the rubbing as described in the article entitled as "Relation between tilt angle of polymer molecules of rubbed alignment layer and pretilt angle of liquid crystal" by K. Y. Han, Euro Display '93, which is expressly incorporated by reference into the present application. This relationship is shown in FIG. 1. Hence, when the surface of the alignment layer consists of multiple regions each with a different tilt angle, the viewing angle of the LCD is increased.

Figure 2:
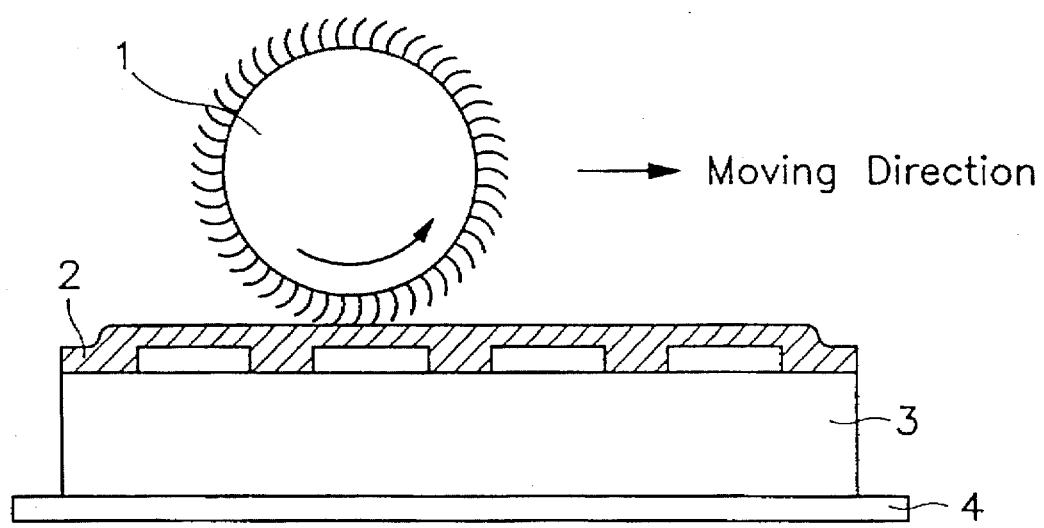
FIG. 2 is a schematic diagram illustrating the rubbing process.

As shown in FIG. 2, a cylindrical roll 1, with the round peripheral surface covered by a piled fabric such as velvet, is rotated with the pile contacting the alignment layer 2 of the TFT or CF glass plate 3 while moving the roll and TFT or CF glass plate relative to each other. One preferred way of moving the roll and TFT or CF glass plate relative to each other is to move the table 4 supporting the glass plate 3 relative to the cylindrical roll 1 so that the surface of the alignment layer is rubbed. Other possible ways of affecting this relative movement would be, for example, moving the roll relative to the table or by placing the TFT or CF glass plate on an endless belt positioned such that the TFT or CF glass plate passed relative to the roll during normal operation.

Figure 3:
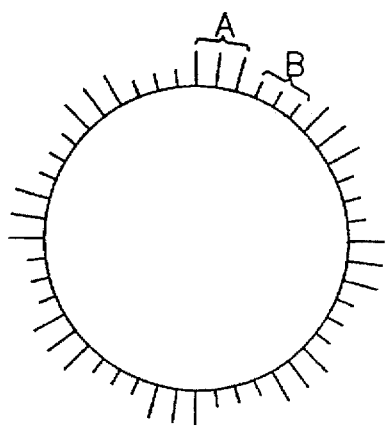
FIG. 3 is a schematic diagram illustrating the cylindrical roll with the round peripheral surface covered by a piled fabric having pile arranged to give the novel rubbing effect.
Figure 4A:
FIGS. 4A to 4D shows various combinations of the tilt angles obtained by the inventive apparatus.
Figure 4B:
Figure 4B:
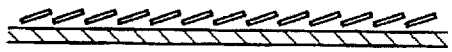
Figure 4C:
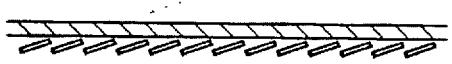
Figure 4C:
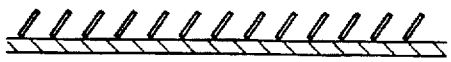
Figure 4D:

According to the present invention, the pile comprises a plurality of sections, properly defined, having alternate long and short pile "A" and "B" respectively, as shown in FIG. 3, around the entire cylindrical roll to alternately vary the rubbing strength of the piled fabric against the alignment layer.

If the rotational speed of the cylindrical roll 1 is 1,000 rpm, and the moving speed of the table 4 is 50 mm/sec, the time taken for one rotation of the roll 1 is 60/1,000 sec. During this time the table 4 is moved a distance of 50 mm/sec× (60/1,000)sec=3 mm. Assuming a pixel size of a 9.4"-type VGA TFT transistor LCD as 300×300 μm, the above calculated 3 mm distance corresponds to ten pixels. Hence, if the piled fabric is formed to include ten equal sections of alternate long and short pile, then the rubbing strength against the alignment layer also alternates as well. Namely, the long pile sections exert a rubbing strength stronger than the short pile sections, so that the alignment layer, after being rubbed only one time, will contains a plurality of sections with alternate large and small molecular tilt angles.

Therefore, after assembling the TFT and C/F glass plates having such alignment layer, with two tilt angles together, the combination of the molecular tilt angles results in four sets of cooperative tilt angles, each of which are illustrated in FIGS. 4A to 4D, so that the viewing angle of the LCD is widened.

What is claimed is:

1. An apparatus for rubbing an alignment layer applied to at least one of a thin film transistor and a color filter glass plate of a liquid crystal display to set a molecular orientation of liquid crystals, comprising:

a cylindrical roll with a round peripheral surface covered by a fabric having pile, said pile comprising a plurality of alternate short and long pile sections which provide alternately varied rubbing strengths of said fabric against said alignment layer; and a table for supporting at least one of said thin film transistor and said color filter glass plate, said cylindrical roll being rotated with said pile contacting said alignment layer of said at least one of said thin film transistor and said color filter glass plate while moving said table relative to said cylindrical roll so that a surface of said alignment layer is rubbed with said alternatively varied rubbing strengths.

2. An apparatus as defined in claim 1, wherein the arrangement of said short and long pile is irregular.

3. An apparatus as defined in claim 1, wherein the number of said pile sections is at least two.

4. An apparatus as defined in claim 2, wherein the number of said pile sections is at least two.

5. An apparatus as defined in claim 1, wherein a rotational speed of said cylindrical roll is related to a moving speed of said table relative to said cylindrical roll.

6. An apparatus as defined in claim 2, wherein a rotational speed of said cylindrical roll is related to a moving speed of said table relative to said cylindrical roll.

7. An apparatus for rubbing an alignment layer of a liquid crystal display, comprising:

a roll having a cylindrical surface;

a fabric which covers said cylindrical surface and includes pile having a plurality of sections, wherein pile contained in each section has different length from pile contained in the other sections, and said sections are arranged regularly.

8. A method of rubbing an alignment layer of a liquid crystal display, the method comprising the steps of:

obtaining a roll having a cylindrical surface covered with a fabric having pile, said pile being divided into at least two alternate sections, one of said sections containing pile of a first length and the other of said sections containing pile of a second length different than said first length; and moving said alignment layer and said roll relative to each other, said roll rotating while contacting said alignment layer with said pile of said roll to rub said alignment layer with varying strengths.

9. An apparatus as defined in claim 1, wherein the arrangement of said short and long pile is regular.

* * * * *